(12) United States Patent
Amsalem

(10) Patent No.: US 12,156,166 B2
(45) Date of Patent: Nov. 26, 2024

(54) RADIO FREQUENCY PORTABLE TAG FOR LOCATION SYSTEM

(71) Applicant: AeroScout Ltd., Ness-Ziona (IL)

(72) Inventor: Reuven Amsalem, Ness Ziona (IL)

(73) Assignee: AeroScout Ltd., Ness Ziona (IL)

( * ) Notice: Subject to any disclaimer, the term of this patent is extended or adjusted under 35 U.S.C. 154(b) by 323 days.

(21) Appl. No.: 17/652,354

(22) Filed: Feb. 24, 2022

(65) Prior Publication Data

US 2022/0279472 A1    Sep. 1, 2022

(30) Foreign Application Priority Data

Feb. 26, 2021 (GB) ...................................... 2102794

(51) Int. Cl.
*H04W 64/00* (2009.01)
(52) U.S. Cl.
CPC .................................. *H04W 64/00* (2013.01)
(58) Field of Classification Search
CPC ..... H04W 64/00; G06K 7/10; G06K 7/10237; G06K 19/07749; G06K 19/0724; G06K 19/077
See application file for complete search history.

(56) References Cited

U.S. PATENT DOCUMENTS

| 5,640,151 | A | 6/1997 | Reis et al. |
| 7,030,761 | B2 | 4/2006 | Bridgelall et al. |
| 8,624,774 | B2 | 1/2014 | De Rosa |
| 9,900,762 | B2 | 2/2018 | Brisebois et al. |
| 10,306,454 | B2 | 5/2019 | Brisebois et al. |
| 10,714,216 | B1* | 7/2020 | Hardman ................... G01S 5/02 |
| 2012/0242481 | A1* | 9/2012 | Gernandt ........... G06K 19/0705 340/572.1 |
| 2016/0097836 | A1 | 4/2016 | Amir et al. |
| 2017/0006424 | A1* | 1/2017 | Liin ...................... H04W 4/023 |
| 2017/0033828 | A1 | 2/2017 | Zhao et al. |
| 2018/0152903 | A1* | 5/2018 | Shavit ................... H04W 64/00 |
| 2020/0122884 | A1* | 4/2020 | Jurcak ................ B65D 19/0075 |
| 2020/0151403 | A1 | 5/2020 | Forster |
| 2020/0228943 | A1* | 7/2020 | Martin .................... H04W 4/80 |
| 2021/0065885 | A1* | 3/2021 | Receveur ............... G16H 40/67 |
| 2021/0098119 | A1* | 4/2021 | Hochworter ........... G16H 40/20 |
| 2021/0165977 | A1* | 6/2021 | Cheng ..................... H04W 4/33 |

FOREIGN PATENT DOCUMENTS

| EP | 1725889 B1 | 1/2008 |
| EP | 2721549 B1 | 5/2015 |
| EP | 2725519 B1 | 5/2015 |
| EP | 2876579 A | 5/2015 |

OTHER PUBLICATIONS

Extended European Search Report dated Jul. 12, 2022 cited in corresponding European Patent Application No. 22155339.9.
GB Search Report Dated Nov. 18, 2021 cited in corresponding GB Application No. GB2102794.1.

* cited by examiner

*Primary Examiner* — Siu M Lee
(74) *Attorney, Agent, or Firm* — Snell & Wilmer LLP

(57) ABSTRACT

A radio frequency portable tag for a location system comprises a transceiver configured to send and receive radio frequency location and communication signals, an activation signal receiver configured to receive activation signals to activate the tag and/or the transceiver, and an activation signal transmitter configured to send activation signals for activating other radio frequency tags.

15 Claims, 2 Drawing Sheets

RADIO FREQUENCY PORTABLE TAG FOR LOCATION SYSTEM

Figure 1:
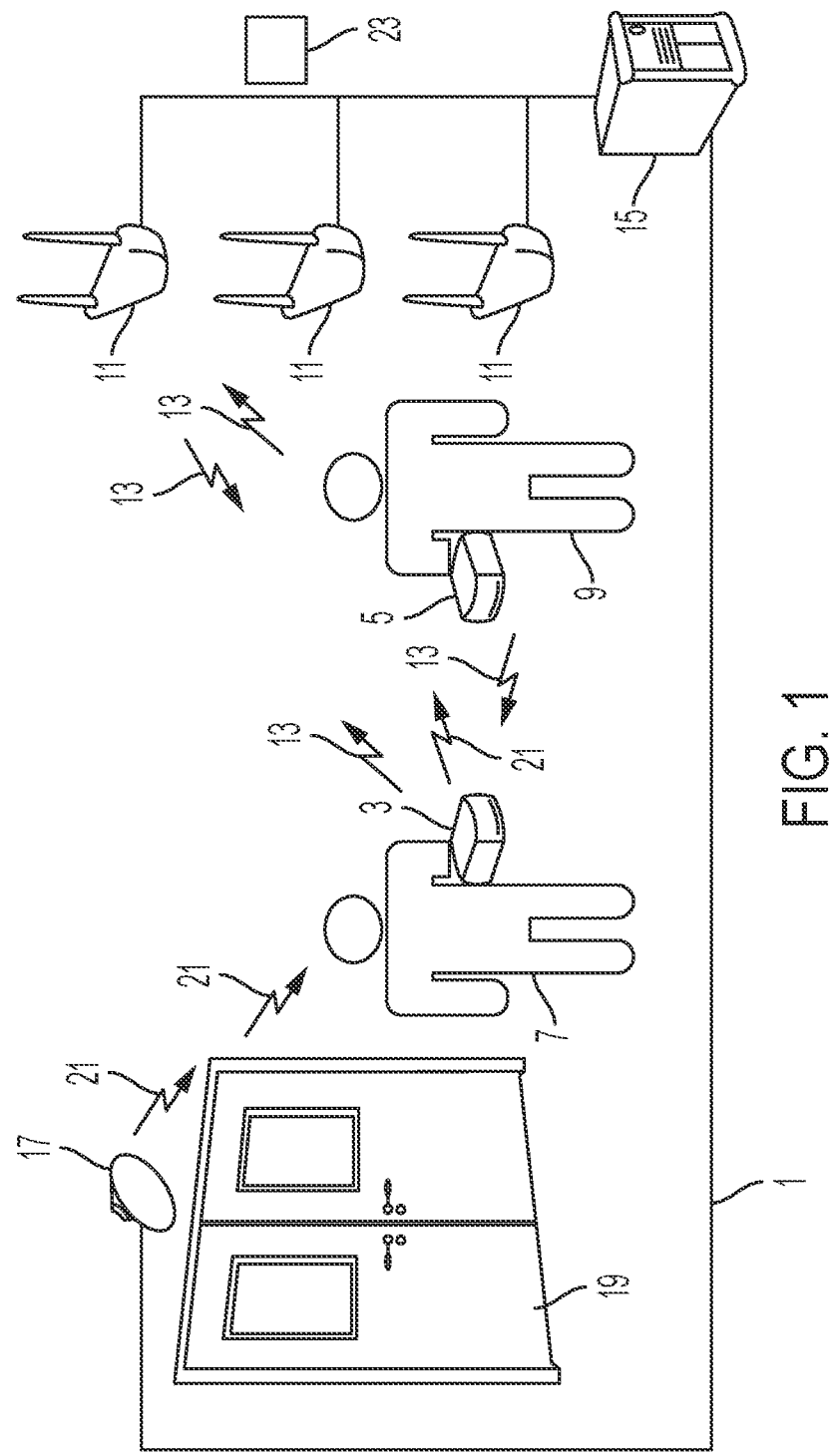

The present invention relates to location systems, especially to so-called real time locations systems (RTLS), in which mobile/portable devices called tags are located, and preferably tracked, by means of wireless signal transmissions. The invention particularly relates to indoor location systems, i.e. location systems arranged to locate mobile devices within buildings.

Such location systems are used for locating, and preferably tracking, articles and/or people associated with respective wireless tags. Location systems are used in a wide range of environments, including hospitals and other healthcare situations, social care environments, prisons, industrial locations, warehouses, retail stores, educational institutions, offices and logistics environments, for example. Such systems include radio frequency tags for locating and tracking patients (especially babies and the elderly) and other categories of people, and for locating and tracking medical supplies, equipment, products, tools and other categories of articles.

Location systems use one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

Location systems use a variety of techniques for calculating the locations of tags. For example, some location systems use measured time of flight, e.g. the times at which wireless transmissions are received (i.e. time-of-arrival (TOA) information). TOA information may be used to calculate differences in times-of-arrival between different wireless receivers or activation signal transmitters and to use the calculated time-difference-of-arrival (TDOA) information to calculate the locations of tags. Additionally or alternatively, location systems may use received signal strengths (e.g. received signal strength indication, RSSI, and/or angle of arrival (AOA) information, and/or round-trip time (RTT) information, radio map fingerprinting information, location information from nearby tags, satellite location information, etc. In some location systems the tags themselves perform at least part of the location calculations.

The tags which are located and tracked in location systems may be active and/or passive. For example, active tags may function as "beacons" which periodically emit wireless signals indicating their presence. Passive tags may, for example, function as transponders, only emitting wireless signals in response to wireless signals emitted by wireless emitters of the location system. Some tags may function sometimes as passive devices and at other times as active devices. Depending upon their functionality, the tags may be self-powered (e.g. battery powered) or may obtain their power from the wireless signals emitted by wireless emitters of the location system.

Some location systems include fixed "exciters" which emit activation signals, e.g. low frequency RF, high frequency RF, or ultrasound, to activate ("wake-up") active tags which are in a sleep mode to conserve battery power. Such exciters are typically located at or near doorways or other "pinch points", and may also be located at other places where it is important to ensure that any tags in the vicinity are active and alerting of their presence by emitting beacon signals. However, inevitably, there is a limit (due to cost and practicality) on the number of exciters that can be installed in any location system, and this can be a limiting factor on the accuracy, performance and functionality of the system.

There is a need to enhance and expand the performance of location systems, for example by improving location accuracy and/or by enabling additional functionality, such as proximity alerts (e.g. for social distancing requirements), hand hygiene alerts, and improved nurse call functionality.

In a first aspect, the present invention provides a radio frequency portable tag for a location system, according to claim 1 of the appended claims.

A second aspect of the invention provides a location system according to claim 11.

Preferred, and other optional, features of the invention are defined and described in the dependent claims.

It is to be understood that any feature, including any preferred feature, of any aspect of the invention may be a feature, including a preferred feature, of any other aspect of the invention.

Accordingly, the invention provides a radio frequency portable tag for a location system, comprising: a transceiver configured to send and receive radio frequency location and communication signals; an activation signal receiver configured to receive activation signals to activate the tag and/or the transceiver; and an activation signal transmitter configured to send activation signals for activating other radio frequency tags.

The radio frequency portable tag of the invention preferably is configured to be worn and/or carried by a person (e.g. worn as a pendant, or attached to the person's clothing by a clip or other attachment device, or carried in a pocket or bag). The radio frequency portable tag therefore preferably has a size, shape and weight enabling easy portability by a person. Additionally, the radio frequency portable tag preferably may be attached to, or otherwise carried on or in, mobile equipment, e.g. medical equipment, or a cart (or the like), or a fork-lift truck (or the like), etc.

The invention also provides a location system comprising one or more such radio frequency portable tags of the invention, and a plurality of the other radio frequency tags. The other radio frequency tags preferably are also mobile/portable tags, e.g. configured to be worn by patients (especially babies and the elderly) and/or other categories of people (depending on where the location system is used), and/or for locating and tracking medical supplies, equipment, products, tools and/or other categories of articles to which the tags may be attached.

As is conventional, the radio frequency portable tag of the invention comprises (i) a transceiver for sending and receiving radio frequency location and communication signals (preferably to and from fixed transceivers, e.g. Wi-Fi™ access points and/or Bluetooth™ or Bluetooth Low Energy™ transceivers, located at various positions throughout a building) and (ii) an activation signal receiver for receiving activation signals (preferably from fixed exciters located at various positions throughout a building) to activate ("wake-up") the tag and/or the transceiver, and preferably to activate the transceiver. However, the radio frequency portable tag of the present invention additionally comprises an activation signal transmitter configured to send activation signals for activating other radio frequency tags of the location system. The portable tag of the invention therefore functions not only as a conventional tag, but also functions as a portable and mobile exciter, activating any other tags in its vicinity.

The invention enables a vast enhancement of the accuracy, performance and functionality of a location system, by providing a location system with one or more (preferably multiple) portable tags which also function as mobile exciters for activating other tags whose vicinity they enter. For example, it can ensure that tags temporarily or permanently located (for example affixed to equipment, e.g. medical equipment in a hospital) in positions outside the range of the fixed exciters (e.g. in signal "black spots") can be activated to "beacon" their presence and location when a person wearing or carrying the portable tag of the invention walks into the vicinity of the other tags. The radio frequency portable tag of the invention can also enable the provision of enhanced functionality for a location system, by indicating a hygiene, proximity, social distancing, nurse call, or other, alarm, activity or status, when the radio frequency portable tag receives a location and communication signal from another radio frequency tag in its vicinity that it has activated. Additionally, or alternatively, the invention can enable a reduction in the number of fixed exciters, while maintaining or enhancing the accuracy, performance and functionality of the location system. It is envisaged that a proportion of the tags in the location system will be the radio frequency portable tags of the invention, with the remainder of the tags being the other (preferably conventional) tags.

The radio frequency portable tag of the invention preferably includes a controller configured to control at least the transceiver and the activation signal transmitter. When a tag is activated, in use, by an activation signal, preferably at least the controller of the tag is activated, and the controller preferably activates the transceiver of the tag. Alternatively, the activation signal may be considered to activate the transceiver of the tag, e.g. via the controller. The tag preferably also comprises a battery configured to power the transceiver, the activation signal receiver and the activation signal transmitter, and preferably the controller.

The transceiver of the radio frequency portable tag preferably is a high frequency transceiver, preferably an ultra-high frequency transceiver and/or a super high frequency transceiver, preferably configured to transmit and receive radio frequency location and communication signals in the low GHz range, e.g. substantially at 2.4 GHz and/or 5 GHz. For example, the transceiver may be configured to send and receive signals according to the IEEE 802.11 series of standards and/or according to the Bluetooth SIG series of specifications, e.g. Bluetooth Low Energy.

The activation signal transmitter, and the activation signal receiver, of the radio frequency portable tag preferably are configured to emit, and receive (respectively), RF signals, e.g. low frequency RF and/or high frequency RF. Low frequency RF activation signals preferably have a frequency in the range 30-300 kHz. A particularly preferred such frequency is 125 kHz, and the activation signals therefore preferably substantially comprise 125 kHz RF signals. For those embodiments of the invention in which the activation signals are high frequency RF signals, they preferably have a frequency in the range 3-30 MHz, e.g. substantially 13.56 MHz, and preferably conform to Near Field Communication (NFC) protocols. For those embodiments of the invention in which the activation signals are ultrasound signals, they preferably have a frequency of at least 20 kHz, e.g. falling in the range 20-70 kHz, especially 20-50 kHz. The currently preferred activation signals are low frequency RF signals, e.g. substantially at 125 kHz, and this specification is framed primarily on this basis, but it is to be understood that, at least in the broadest aspects of the invention, other types of activation signals may be used, e.g. high frequency RF (especially NFC), or ultrasound. Any fixed exciters of the location system of the invention preferably are configured to emit the same type of activation signals as the radio frequency tags of the invention.

The radio frequency portable tag may be configurable or configured such that the activation signal transmitter continuously or continually transmits activation signals, in use. Additionally or alternatively, the radio frequency portable tag may be configurable or configured such that the activation signal transmitter is activated to transmit activation signals when the activation signal receiver receives an activation signal from another device, e.g. from a fixed exciter and/or from another radio frequency portable tag of the location system.

Preferably, the radio frequency portable tag is configured or configurable such that an activation range of the activation signals sent by the activation signal transmitter is adjustable. The tag preferably is configured such that the activation signals sent by the activation signal transmitter are for activating other radio frequency tags in the vicinity, preferably in the immediate vicinity, of the radio frequency portable tag, e.g. in the range from 0 to between 1 and 5 meters away, or from 0 to between 1 and 3 meters away, or from 0 to between 1 and 2 meters away, or even from 0 to about 0.5 meters away, depending on the specific requirements (e.g. proximity alerts for social distancing, hand hygiene monitoring, nurse call requirements, etc.).

As described above, the invention also provides a location system comprising one or more radio frequency portable tags according to the invention, and a plurality of other radio frequency tags.

As is conventional, the other radio frequency tags preferably comprise: (i) a transceiver configured to send and receive radio frequency location and communication signals (preferably to and from fixed transceivers, e.g. Wi-Fi access points and/or Bluetooth™ (e.g. Bluetooth Low Energy) transceivers, located at various positions throughout a building); and (ii) an activation signal receiver configured to receive activation signals from the radio frequency portable tag(s) of the invention and/or from fixed exciters of the location system, to activate ("wake-up") the tag and/or the transceiver, and to activate the transceiver.

Each of the other radio frequency tags of the location system preferably is configured to send a radio frequency location and communication signal when its transceiver is activated by its activation signal receiver receiving an activation signal from a radio frequency portable tag of the invention. Preferably, the location and communication signal sent by a said other radio frequency tag includes information indicating that it was activated by the radio frequency portable tag of the invention.

Preferably, the radio frequency location and communication signals sent by the tags of the location system (i.e. both the radio frequency portable tag(s) of the invention, and the other tags in the system) comprise data enabling the location of the tag to be determined and data enabling the identity of the tag to be determined.

The location system of the invention preferably also includes a plurality of radio frequency location and communication transceivers configured to be fixed in place, and also configured to send and receive radio frequency location and communication signals to and from (respectively) the transceiver of the, or each, tag (i.e. both the radio frequency portable tag(s) of the invention, and the other tags in the system).

Additionally, the location system preferably includes a server, preferably a so-called location engine, in communication with the fixed location and communication transceivers, preferably configured to determine the respective locations of the tags of the system (i.e. both the radio frequency portable tag(s) of the invention, and the other tags in the system).

The location system preferably also includes a plurality of exciter devices configured to be fixed in place, and also configured to send activation signals for activating the tags, preferably for activating the tags in their vicinity, more preferably in their immediate vicinity (e.g. in the range from 0 to between 1 and 5 meters away, e.g. from 0 to between 1 and 3 meters away, or from 0 to between 1 and 2 meters away, or even from 0 to about 0.5 meters away, depending on the specific requirements). The system may be configured such that the fixed exciters activate ("wake up") any dormant radio frequency portable tags of the invention that come into their vicinity, as well as any dormant other tags of the system, for example.

The (or each) radio frequency portable tag of the invention preferably is configured to receive a radio frequency location and communication signal from a said other radio frequency tag of the system when the radio frequency portable tag activates the other radio frequency tag, and the radio frequency portable tag preferably is configured to react, for example by emitting a radio frequency location and communication signal (e.g. for receipt by a fixed location and communication transceiver of the location system) in response to receiving such a signal from a said other tag. For example, the (or each) radio frequency portable tag may be configured to be able to indicate an alarm, activity or status and/or to send an alarm, activity or status indication signal, e.g. indicating a hygiene, proximity, social distancing, or nurse call, alarm, activity or status, when the radio frequency portable tag receives a location and communication signal from a said other radio frequency tag in its vicinity that it has activated. Preferably, the location system is configured such that an alarm, activity or status indication signal sent by a radio frequency portable tag is received by a fixed location and communication transceiver and sent to a server of the location system for alerting users of the location system.

Figure 2:
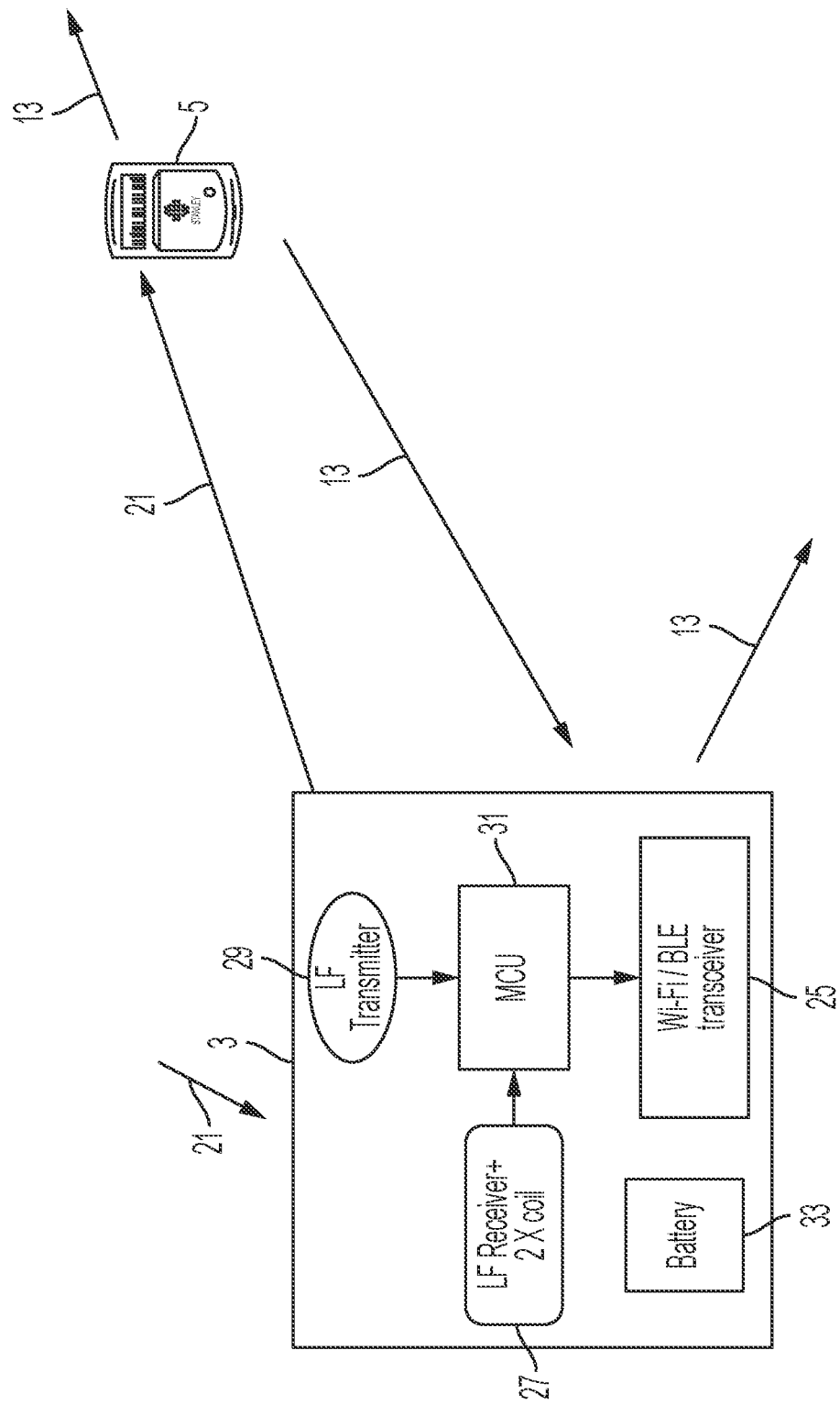

Preferred implementations and embodiments of the invention will now be described, by way of example, with reference to the accompanying drawings, of which:

FIG. 1 is a schematic illustration of an implementation of a location system according to the invention; and FIG. 2 is a schematic illustration of a radio frequency portable tag according to the invention, and another tag of the location system.

FIGS. 1 and 2 are schematic illustrations of, respectively, an implementation of a location system 1 according to the invention, and an embodiment of a radio frequency portable tag 3 according to the invention in the proximity of another (preferably conventional) tag 5 of the location system. Both tags 3 and 5 are schematically shown as being carried by respective people 7, 9, in a building (e.g. a hospital, warehouse, or other facility). The radio frequency portable tag 3 of the invention is configured to be worn and/or carried by a person 7 (e.g. worn as a pendant, or attached to the person's clothing by a clip or other attachment device, or carried in a pocket or bag). The radio frequency portable tag 3 therefore has a size, shape and weight enabling easy portability by a person 7. (Additionally, the radio frequency portable tag 3 could be attached to, or otherwise carried on or in, mobile equipment, e.g. medical equipment, or a cart, or a fork-lift truck, etc.) The other tag 5 is similarly portable, as is conventional.

The location system 1 comprises one or more radio frequency portable tags 3 of the invention (only one is shown, for simplicity), and a plurality of other tags of the system (again, only one is shown, for simplicity). The location system 1 also includes a plurality of radio frequency location and communication transceivers 11 configured to be fixed in place, and also configured to send and receive radio frequency location and communication signals 13 to and from (respectively) the transceiver of the, or each, tag 3, 5 (i.e. both the radio frequency portable tag(s) of the invention, and the other tags in the system). Advantageously, the location and communication transceivers 11 may comprise Wi-Fi™ access points and/or Bluetooth™ (e.g. Bluetooth Low Energy™) transceivers located throughout the building where the location system 1 is installed.

The location system 1 also includes a server 15, i.e. a so-called location engine, in communication with the fixed location and communication transceivers 11, configured to determine the respective locations of the tags 3, 5 of the system 1 (i.e. both the radio frequency portable tag(s) of the invention, and the other tags in the system). The location system 1 also includes a plurality of exciter devices 17 (only one of which is shown, for simplicity) configured to be fixed in place at various points throughout the building, e.g. by doorways 19 (as illustrated) and/or at other types of "pinch points" or other locations. In this preferred implementation, the exciter devices 17 are configured to send low frequency (e.g. 125 kHz) activation signals 21 for activating the tags 3, 5 in their vicinity, e.g. in the range from 0 to between 1 and 5 meters away, or from 0 to between 1 and 3 meters away, or from 0 to between 1 and 2 meters away, or even from 0 to about 0.5 meters away, depending on the specific requirements. (Alternatively, the exciter devices 17 could be configured to send high frequency RF (e.g. NFC), or ultrasound, activation signals.) The location system 1 may be configured such that the fixed exciters 17 activate ("wake up") any dormant radio frequency portable tags 3 of the invention that come into their vicinity, as well as any dormant other tags 5 of the system 1, for example. The fixed transceivers 11, exciters 17, and server 15, all form part of a local area network 23 in the building. The local area network 23 may be connected, or connectable, to a wide area network and/or the worldwide web, for example.

As shown schematically in FIG. 2, the (or each) radio frequency portable tag 3 of the location system 1 comprises: a transceiver 25 for sending and receiving the radio frequency location and communication signals 13; an activation signal receiver 27 for receiving the activation signals 21 to activate ("wake-up") the tag 3 and/or the transceiver 25, and to activate the transceiver; and additionally an activation signal transmitter 29 configured to send activation signals 21 for activating other radio frequency tags 5 of the location system 1. The radio frequency portable tag 3 of the invention therefore functions not only as a conventional tag (such as the tags 5), but also functions as a portable and mobile exciter, activating any other tags in its vicinity. The radio frequency portable tag 3 also includes a controller 31 (micro-controller unit, MCU) configured to control the transceiver 25, the activation signal transmitter 29, and the activation signal receiver 27. The radio frequency portable tag 3 also includes a battery 33 configured to power the transceiver 25, the activation signal receiver 27, the activation signal transmitter 29, and the controller 31.

Advantageously, the transceiver 25 of the radio frequency portable tag 3 is an ultra-high frequency transceiver and/or a super high frequency transceiver, configured to transmit and receive radio frequency location and communication signals in the low GHz range, e.g. substantially at 2.4 GHz and/or 5 GHz. For example, the transceiver 25 may be configured to send and receive signals according to the IEEE 802.11 series of standards and/or according to the Bluetooth SIG series of specifications, e.g. Bluetooth Low Energy™ (BLE).

The radio frequency location and communication signals 13 sent by the tags of the location system 1 (i.e. both the radio frequency portable tag(s) 3 of the invention, and the other tags 5 in the system) advantageously comprise data enabling the location of the tag to be determined and data enabling the identity of the tag to be determined. For example, the radio frequency location and communication signals 13 sent by each tag may comprise an ID number of that tag and part of a message contained in an activation signal 21 which activated the transceiver of the tag, e.g. the ID number of the tag 3 or the exciter 17 (and/or the exciter location, for a fixed exciter 17) which emitted the activation signal 21. The radio frequency location and communication signals 13 may be used by the location system 1 to locate the tags, by any one or more of a variety of known techniques, e.g. time-of-arrival (TOA) information, time-difference-of-arrival (TDOA) information, received signal strength indication (RSSI), angle of arrival (AOA) information, round-trip time (RTT) information, etc.

The activation signal transmitter 29 of the radio frequency portable tag 3 advantageously is configured to emit low frequency RF signals having a frequency in the range 30-300 kHz. A particularly preferred such frequency is 125 kHz, and the activation signals 21 therefore preferably substantially comprise 125 kHz signals. The activation signal receiver 27 of the radio frequency portable tag 3 is also configured to receive the RF activation signals 21 having a frequency in the range 30-300 kHz, more preferably, substantially at 125 kHz. As indicated above, the activation signal transmitter 29 and receiver 27 could additionally or alternatively be configured for high frequency RF signals (e.g. substantially 13.56 MHz NFC) and/or ultrasound signals.

The radio frequency portable tag 3 may be configurable or configured such that its activation signal transmitter 29 continuously or continually transmits activation signals 21, in use. Additionally or alternatively, the radio frequency portable tag 3 may be configurable or configured such that the activation signal transmitter 29 is activated to transmit activation signals 21 when the activation signal receiver 27 receives an activation signal 21 from another device, e.g. from a fixed exciter 17 and/or from another radio frequency portable tag 3 of the location system 1.

Advantageously, the radio frequency portable tag 3 may configured or configurable such that an activation range of the activation signals 21 sent by its activation signal transmitter 29 is adjustable. The tag 3 may configured such that the activation signals 21 sent by the activation signal transmitter 29 are for activating other radio frequency tags 5 in the vicinity, e.g. in the immediate vicinity, of the radio frequency portable tag, for example in the range from 0 to between 1 and 5 meters away, or from 0 to between 1 and 3 meters away, or from 0 to between 1 and 2 meters away, or even from 0 to about 0.5 meters away, depending on the specific requirements, such as proximity alerts for social distancing, hand hygiene monitoring, nurse call requirements, etc.

The (or each) radio frequency portable tag 3 of the invention advantageously is configured to receive a location and communication signal 13 from another radio frequency tag 5 of the system 1 when the radio frequency portable tag 3 activates the other radio frequency tag 5. Additionally, the radio frequency portable tag 3 may be configured to react, for example by emitting a location and communication signal 13 for receipt by a fixed location and communication transceiver 11, in response to receiving such a signal from another tag 5. For example, the (or each) radio frequency portable tag 3 may be configured to be able to indicate an alarm, activity or status and/or to send an alarm, activity or status indication signal, e.g. indicating a hygiene, proximity, social distancing, or nurse call, alarm, activity or status, when the radio frequency portable tag 3 receives a location and communication signal 13 from another radio frequency tag 5 that it has activated. The location system 1 may be configured such that an alarm, activity or status indication signal sent by a radio frequency portable tag 3 is received by a fixed location and communication transceiver 11 and sent to the server 15 for alerting users of the location system 1.

The invention thus enables a vast enhancement of the accuracy, performance and functionality of a location system, by effectively providing a location system with one or more (preferably multiple) portable tags which also function as mobile exciters for activating other tags whose vicinity they enter. For example, it can ensure that tags 5 temporarily or permanently located (for example affixed to equipment, e.g. medical equipment in a hospital) in positions outside the range of the fixed exciters 17 (e.g. in signal "black spots") can be activated to "beacon" their presence, identity and location when a person 7 wearing or carrying a portable tag 3 of the invention walks into the vicinity of the other tags 5. The radio frequency portable tag 3 of the invention can also enable the provision of enhanced functionality for a location system, by indicating a hygiene, proximity, social distancing, nurse call, or other, alarm, activity or status, when the radio frequency portable tag 3 receives a location and communication signal 13 from another radio frequency tag 5 in its vicinity, that it has activated. Additionally, or alternatively, the invention can enable a reduction in the number of fixed exciters 17, while maintaining or enhancing the accuracy, performance and functionality of the location system. It is envisaged that a proportion of the tags in the location system will be the radio frequency portable tags 3 of the invention, with the remainder of the tags being the other (preferably conventional) tags 5.

It will be understood that the above description and the drawings are examples of particular implementations and embodiments of the invention, but that other implementations and embodiments of the invention are included in the scope of the claims.

What is claimed is:

1. A radio frequency portable tag for a location system, comprising:
    a transceiver configured to send and receive radio frequency location and communication signals;
    an activation signal receiver configured to receive activation signals to activate the radio frequency portable tag and/or the transceiver; and
    an activation signal transmitter configured to send activation signals for activating other radio frequency tags;
    wherein the transceiver is configured to send a radio frequency location and communication signal including information indicating that the radio frequency portable tag was activated by at least one of the other radio frequency tags.

2. The radio frequency portable tag according to claim 1, further comprising a controller configured to control the transceiver and the activation signal transmitter, wherein activation of the radio frequency portable tag comprises activation of the controller.

3. The radio frequency portable tag according to claim 2, further comprising a battery configured to power the transceiver, the activation signal receiver, the activation signal transmitter, and the controller.

4. The radio frequency portable tag according to claim 1, wherein the transceiver is one of a high frequency transceiver, an ultra-high frequency transceiver and a super high frequency transceiver.

5. The radio frequency portable tag according to claim 4, wherein the transceiver is configured to send and receive signals according to at least one of the IEEE 802.11 standards, the Bluetooth SIG specifications, and the Bluetooth Low Energy standard.

6. The radio frequency portable tag according to claim 1, wherein the activation signals comprise at least one of low frequency RF signals, high frequency RF signals, and 125 kHz RF signals.

7. The radio frequency portable tag according to claim 1, wherein the activation signal transmitter is activated to transmit activation signals when the activation signal receiver receives an activation signal from another device.

8. The radio frequency portable tag according to claim 7, wherein the another device is at least one of a fixed exciter and a second radio frequency portable tag.

9. A location system comprising
a first radio frequency portable tag, comprising:
- a transceiver configured to send and receive radio frequency location and communication signals;
- an activation signal receiver configured to receive activation signals to activate the first radio frequency portable tag and/or the transceiver; and
- an activation signal transmitter configured to send activation signals for activating other radio frequency tags;

a second radio frequency portable tag;
wherein the first radio frequency portable tag is configured to send a location and communication signal when the first radio frequency portable tag or the transceiver of the first radio frequency portable tag is activated by the activation signal receiver of the first radio frequency portable tag receiving an activation signal from the second radio frequency portable tag, and
wherein the location and communication signal sent by the first radio frequency portable tag includes information indicating that the first radio frequency portable tag was activated by the second radio frequency portable tag.

10. The location system according to claim 9, further comprising a plurality of location and communication transceivers configured to be fixed in place, for sending and receiving radio frequency location and communication signals to and from at least one of the first and second radio frequency portable tags.

11. The location system according to claim 10, further comprising a server, in communication with the fixed location and communication transceivers, for determining respective locations of the first and second radio frequency portable tags.

12. The location system according to claim 10, further comprising a plurality of exciter devices configured to be fixed in place for sending activation signals for activating at least one of the first and second radio frequency portable tags.

13. The location system according to claim 9, wherein the second radio frequency portable tag is configured to receive the location and communication signal from the first radio frequency portable tag when the second radio frequency portable tag activates the first radio frequency portable tag.

14. The location system according to claim 13, wherein the second radio frequency portable tag is configured to indicate an alarm, activity or status and/or to send an alarm, activity or status indication signal indicating one or more of a hygiene, proximity, social distancing, or nurse call, alarm, activity or status, when the second radio frequency portable tag receives a location and communication signal from the first radio frequency tag.

15. The location system according to claim 14, wherein the location system is configured such that the alarm, activity or status indication signal sent by the second radio frequency portable tag is received by a fixed location and communication transceiver and sent to a server for alerting users of the location system.

* * * * *